Figure 1:
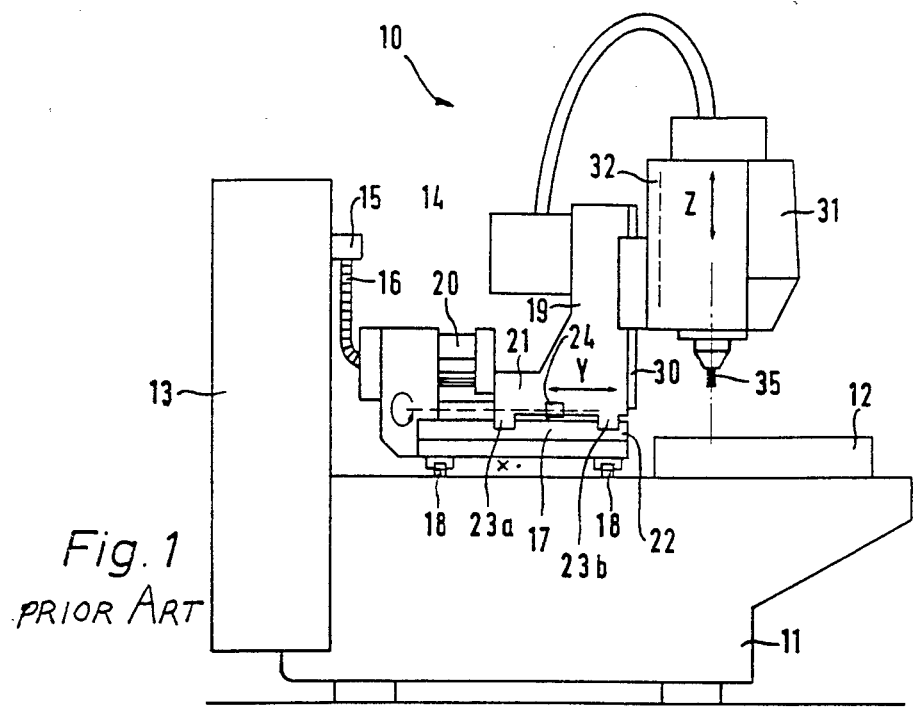

United States Patent [19]

Winkler et al.

[11] Patent Number: 4,911,589
[45] Date of Patent: Mar. 27, 1990

[54] MACHINE TOOL

[75] Inventors: Hans-Henning Winkler, Tuttlingen; Eugen Rütschle, Mühlheim; Rudolf Haninger, Seitingen, all of Fed. Rep. of Germany

[73] Assignee: Chiron-Werke GmbH & Co., KG, Tuttlingen, Fed. Rep. of Germany

[21] Appl. No.: 245,122

[22] Filed: Sep. 15, 1988

[30] Foreign Application Priority Data

Sep. 16, 1987 [DE] Fed. Rep. of Germany ....... 3731005

[51] Int. Cl.$^4$ .............................................. B23C 1/06
[52] U.S. Cl. ...................................... 409/235; 408/88; 408/234
[58] Field of Search ............... 409/235, 241, 202, 190, 409/191; 408/88, 234

[56] References Cited

U.S. PATENT DOCUMENTS 3,468,196 9/1969 Muller ............................. 409/235 X
3,559,530 2/1971 Wagner et al. ..................... 409/190

FOREIGN PATENT DOCUMENTS 957706 6/1952 Fed. Rep. of Germany .
3425244 7/1984 Fed. Rep. of Germany .
532441 6/1970 Switzerland .

Primary Examiner—Z. R. Bilinsky
Attorney, Agent, or Firm—Pretty, Schroeder, Brueggemann & Clark

[57] ABSTRACT

A machine tool comprises a motion unit that can be displaced relative to a work table along a horizontal axis. Guide rails extend in the direction of the axis, being fixed against movement in this direction. Supporting guide elements of the motion unit run on the guide rails in axially offset arrangement. A drive motor serves for effecting a relative movement between the motion unit and the guide rails.

In order to reduce the overall depth of the machine tool in the direction of the axis and to improve the accessibility of the drive elements, the drive motor has its stator rigidly connected to the said motion unit and is arranged in substantially axial orientation between the said guide elements.

1 Claim, 2 Drawing Sheets

MACHINE TOOL

The present invention relates to a machine tool comprising a motion unit that can be displaced relative to a work table along a horizontal axis, guide rails extending in the direction of the axis, being fixed against movement in this direction and supporting guide elements of the motion unit running thereon in axially offset arrangement, and a drive motor for effecting a relative movement between the said motion unit and the said guide rails.

A machine tool of this type has been known from a leaflet entitled "CNC Fertigungszentrum (machining center) FZ 16".

The known machine tool comprises a stationary work table arranged in a horizontal plane, which table may have a length of several meters in a horizontal direction.

The user of the machine tool is positioned in front of one longitudinal side of the work table. Behind the opposite longitudinal side of the work table a switch cabinet, approximately high as a man, is arranged which contains all electric and electronic components required for ensuring the current supply and for controlling the machine tool. The machine bed of the machine tool extends also over the area between the work table and the switch cabinet. In this space, a guide extending in parallel to the longitudinal extension of the work table is arranged on the machine table, along the so-called x axis. An x carriage provided on its upside with two upper guide rails extending perpendicularly to the x axis, namely along the so-called y axis, is arranged to move along the x axis. The y guide rails serve as guides for an y carriage. In order to enable the y carriage to be moved relative to the x carriage, a drive motor is arranged on the x carriage, between the y carriage and the switch cabinet, for setting a spherical threaded spindle extending along the y axis into rotary movement. The spherical threaded spindle coacts with a threaded sleeve arranged in the y carriage so that the y carriage is displaced along the y axis when the drive motor is operating.

Two additional guide rails which extend in vertical direction and parallel to each other and which are intended for enabling a spindle stock to be displaced along the vertical axis, i.e. the so-called z axis, are provided on the front of the y carriage, i.e. the side facing the work table. To this end, a stationary threaded spindle is provided between the vertical guide rails for coacting with a threaded sleeve seated rotatably in the spindle stock.

It is possible in this manner to displace the spindle stock in the direction of three cartesian coordinates.

However, the known machine tool is connected with the disadvantage that it requires a relatively big overall depth, which may lead to space problems in particular under cramped workshop conditions. In addition, maintenance and repair work can be carried out only with difficulty on the y drive because the y drive motor is not readily accessible being arranged between the y carriage and the switch cabinet. Particular difficulties are encountered when disassembling the drive elements in the direction of the y axis because any movement in the direction of the y axis is limited by the switch cabinet on the one side and the y carriage on the other side.

Now, it is the object of the present invention to improve a machine tool of the type described above so as to reduce the overall depth of the machine tool and improve at the same time the accessibility of the drive elements of the y drive.

This object is achieved according to the invention by the fact that the drive motor has its stator rigidly connected to the motion unit and is arranged in substantially axial orientation between the guide elements.

This solves the object underlying the present invention completely and perfectly because by integrating the y drive motor into the y carriage one achieves on the one hand a dramatic reduction of the overall depth of the motion unit and, accordingly, of the whole machine tool, while on the other hand the drive elements of the y drive are now accessible from the front of the y carriage so that it is no longer necessary to carry out difficult and troublesome work in the space between the switch cabinet and the y carriage.

In practice, this leads to a reduction in the overall depth of the machine tool of approximately half a meter, and the time needed for replacing an y drive is reduced to a fraction of the time required according to the state of the art.

According to a preferred embodiment of the invention, the guide rails are connected rigidly with a threaded sleeve and the drive motor drives a threaded spindle running in the threaded sleeve.

The advantage of this feature resides in the fact that it provides a precise feeding mechanism for the machine tool and that the feeding mechanism can be optimally seated. According to a preferred embodiment of the invention, the threaded spindle carries a gear, the axes of the threaded spindle, the gear and the drive motor extend parallel to each other and the gear is driven by another gear of the drive motor, preferably via a toothed belt.

This feature permits a particularly space-saving design because the longitudinal axis of the drive motor can be arranged directly adjacent the threaded spindle which is provided in parallel arrangement, and offers the additional advantage that it is now possible to provide a convenient gear ratio between the gears, for example a reduction ratio for the speed of the drive motor, with a view to achieving a particularly slow and sensitive feed motion in the y direction.

According to a particularly preferred embodiment of the invention, one front face of the motion unit is provided —in a manner known as such —with two vertical guide rails for vertical displacement of a spindle stock, and the detachable drive motor can be removed from the motion unit between the vertical guide rails, in forward direction.

This feature provides the substantial advantage that the assembly time required for exchanging the y drive is reduced to a fraction of the working time required according to the state of the art because only a few screws have to be untightened whereafter the drive motor, or if necessary the complete drive, can be removed from the front of the motion unit, between the vertical guide rails.

According to a particularly preferred feature of this embodiment, the gears and the toothed belt are arranged between the vertical guide rails, and their end faces are substantially aligned with front faces of the vertical guide rails.

This feature provides the advantage that the overall depth of the machine tool is fully utilized because the space which is anyway available between the vertical guide rails is now used for accommodating the transmission consisting of the gears and the toothed belt which, therefore, does not require any additional depth.

Other advantages will be apparent from the following description and the attached drawing.

It is understood that the features that have been described above and will be explained hereafter can be used not only in the staed combinations, but also in any other combination or individually, without leaving the scope and intent of the present invention.

Figure 2:
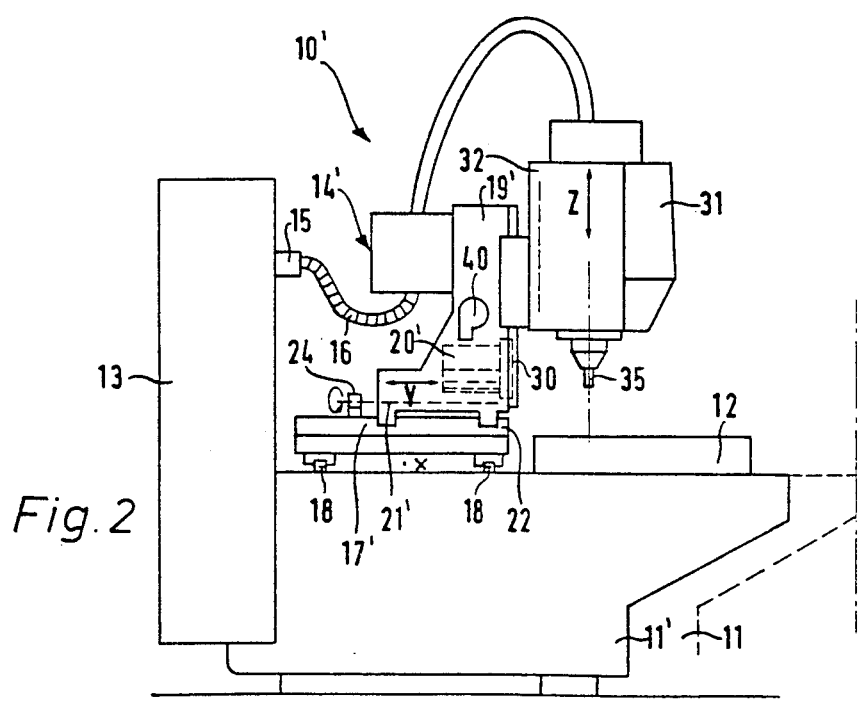
Figure 3:
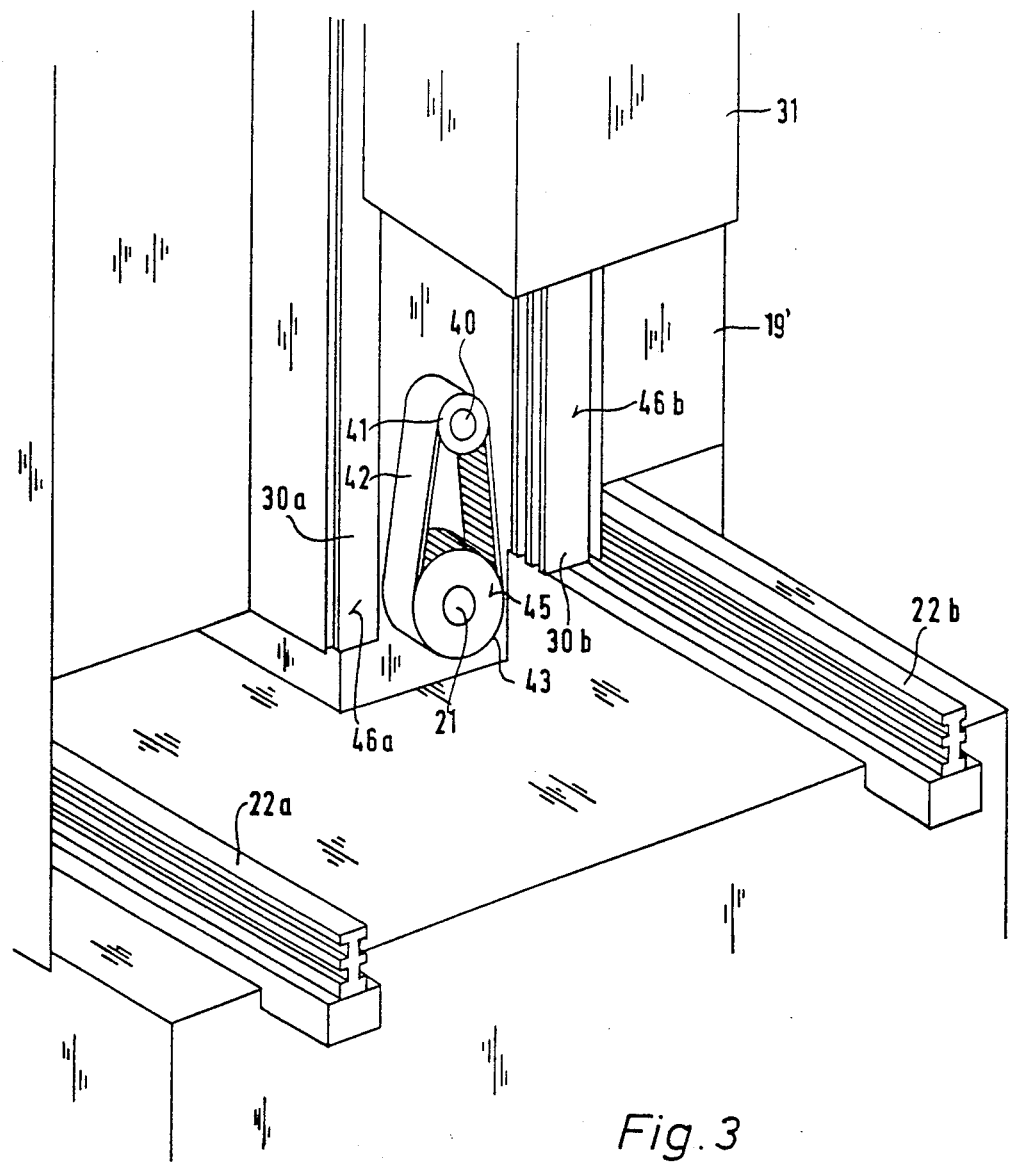

Certain embodiments of the invention have been illustrated in the drawing and will now be described in more detail with reference to the drawing in which FIG. 1 shows a diagrammatic side view of a machine tool according to the prior art;

FIG. 2 shows a view similar to that of FIG. 1, but of a machine tool according to the invention; and FIG. 3 shows a perspective partial front view of the machine tool illustrated in FIG. 2.

Referring now to FIG. 1, a machine tool which is used substantially as a machining center for drilling and milling workpieces, is generally designated by reference numeral 10. The machine tool 10 comprises a machine bed 11 carrying a worktable 12 arranged in a horizontal plane. The work table 12 may be several meters long in a direction perpendicular to the drawing plane of FIG. 1.

At the rear of the machine tool 10 one can see a switch cabinet 13, which is approximately high as a man and extends over a length of one to three meters in parallel to the work table 12.

In the space between the work table 12 and the switch cabinet 13, a movable unit indicated generally by reference numeral 14 is arranged on the machine bed 11 for effecting movements in the direction of three cartesian coordinates.

The movable unit 14 is supplied with electric energy, compressed air, electric control signals, and the like, via a connection 15 and a flexible line 16.

An x-motion unit 17 is arranged on rollers 18 for being displaced on the machine bed 11 in a direction perpendicular to the drawing plane of FIG. 1. The drive elements needed for this purpose are not shown in detail for the sake of clarity.

An y-motion unit 19 is arranged on the x-motion unit 17 and is driven by an y-drive motor 20 mounted rigidly on the x-motion unit 17, via a rotating y spindle 21, for example a spherical threaded spindle. The y-motion spindle 19 runs on y-guide rails 22 mounted rigidly on the upper face of the x-motion unit 17, in a direction perpendicular to the x axis. The y-motion unit 19 is equipped for this purpose with guide elements 23, for example rollers or skids, travelling on the y-guide rails 22 in form-locking engagement. The y-motion unit 19 comprises further a rigidly connected threaded sleeve 24 coacting with the y spindle 21. When the y-drive motor 20 is operating so as to set the y spindle 21 into rotary movement, this will cause the y-motion unit 19 to move in the direction of the y axis.

The y-motion unit 19 is provided on its front face, i.e. on its side facing the work table 12, with two vertical z-guide rails 30 along which a spindle stock 31 can be displaced in vertical direction by means of a z spindle 32.

The spindle stock 31 comprises drive elements for a spindle adapted for chucking a tool 35.

The before-described motion units 17, 19 and 31 permit the tool 35 to be displaced in the direction of three cartesian coordinates x, y and z and to carry out in this manner machining operations on a workpiece mounted on the work table 12.

As can be seen in FIG. 1, the y-drive motor 20 requires considerable space in the area between the switch cabinet 13 and the y-motion unit 19. Accordingly, the machine tool 10 has a considerable depth in the direction of the y axis. In addition, it is obviously troublesome to work on the y drive motor 20, especially if the latter or the y spindle 21 has to be disassembled, because very little space is available in the direction of the y axis between the switch cabinet 13 and the y-motion unit 19.

The machine tool 10' illustrated in FIG. 2 differs from the machine tool 10 according to FIG. 1, which represents the state of the prior art, in that the y-drive motor 20' is integrated into the y-motion unit 19'. The stator of the y-drive motor 19' is now rigidly connected with the y-motion unit 19 and arranged inside the area between the guide elements 23, it being understood that this arrangement need not necessarily be symmetrical, and that the drive motor 20'may project slightly on one or both sides of the guide elements 23.

The flexible line 16' is connected to the y-motion unit 19' in the case of the machine according to the invention, which makes the x-motion unit 17' free from any connections.

The threaded sleeve 24' of the machine tool 10' according to the invention is fixed rigidly on the x-motion unit 17. The y-drive motor 20' drives again the y spindle 21 which is now fixed to the y-motion unit 19 in axially rigid relationship. Consequently, when the y spindle 21 is set into rotation, the y-motion unit 19 performs a movement in the y direction.

As can be seen in FIG. 2, but particularly clearly in fig. 3, further space savings are rendered possible by the fact that certain elements of the y drive are arranged in the space between the vertical z guide rails 30a and 30b which is otherwise free from installations.

A blower 40 is provided in the y-motion unit 19' for direct cooling of the y drive motor 20'.

In FIG. 3, a shaft 40 of the y-drive motor 20' can be seen which drives a first gear 41. A toothed belt 42 running on the first gear 41 drives a second gear 43 mounted on the y spindle 21'. One obtains in this manner a space-saving design, with the y drive motor 20' and the y spindle 21' arranged in parallel one above the other; in addition, the gears 41 and 43 may be sized conveniently to set a desired gear ration so as to translate the relatively high driving speed of the y drive motor 20' into a correspondingly reduced speed of the y spindle 21'.

The arrangement is, preferably, selected in such a manner that the end faces 45 of the gears 41, 43 are aligned with front faces 46 of the vertical z guide rails 30a and 30b. This arrangement ensures that the path of movement of the spindle stock 31 remains unobstructed.

Due to the fact that the front of the y-motion unit 19', which can be seen best in FIG. 3, is freely accessible, the y drive elements, i.e. the y drive motor 20' and the y spindle 21', can be easily removed from the y-motion unit 19' towards the front.

What is claimed is:

1. A machine tool comprising:
   (a) a worktable;
   (b) first displacement means;
   (c) first drive means for effecting relative linear displacement between said worktable and said first displacement means on a first horizontal axis;

(d) first guide rails attached to said first displacement means and extending parallel to a second horizontal axis, said second horizontal axis extending perpendicularly to said first axis, said first guide rails being rigidly connected to a threaded sleeve arranged along said second horizontal axis;

(e) second displacement means having guide elements running on said first guide rails, each of said first guide rails having two guide elements running thereon and being spaced from each other in a direction parallel to said second horizontal axis, said second displacement means being provided with a front face having vertical second guide rails;

(f) third displacement means guided along a third vertical axis by said vertical second guide rails on said second displacement means, said third displacement means carrying a spindle stock;

(g) a drive motor having a stator and a rotor and being arranged in said second displacement means, said drive motor further being arranged axially between said two guide elements, said stator being rigidly connected to said second displacement means, said drive motor being, further, detachably integrated in said second displacement means and being designed so as to allow removal of said drive motor from said second displacement means between said vertical second guide rails in a direction parallel to said second horizontal axis; and h) a threaded spindle running in said threaded sleeve, said threaded spindle being provided with a first pinion, wherein said threaded spindle, said first pinion and said drive motor extend axially parallel to said second horizontal axis, said first pinion is driven by a second pinion via a toothed belt, said second pinion is, in turn, driven by said drive motor, and said first pinion, said second pinion and said toothed belt are arranged between said vertical second guide rails, with the front and faces of said first and second pinion, of said toothed belt and of said vertical guide rails being essentially flush with respect to each other.

* * * * *